United States Patent
Shu et al.

(10) Patent No.: US 8,538,382 B2
(45) Date of Patent: Sep. 17, 2013

(54) METHOD, DEVICE, AND SYSTEM FOR NETWORK EXIT OR DE-REGISTRATION OF FEMTO BASE STATION

(75) Inventors: Guiming Shu, Shenzhen (CN); Zhiming Ding, Shenzhen (CN); Yongli Yang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/544,581

(22) Filed: Jul. 9, 2012

(65) Prior Publication Data

US 2012/0276875 A1 Nov. 1, 2012

Related U.S. Application Data

(63) Continuation of application No. PCT/CN2010/078939, filed on Nov. 22, 2010.

(30) Foreign Application Priority Data

Jan. 9, 2010 (CN) .......................... 2010 1 0003874

(51) Int. Cl.
  *H04M 1/66* (2006.01)
  *H04M 1/68* (2006.01)
  *H04M 3/16* (2006.01)
  *H04W 4/00* (2009.01)
  *H04W 36/00* (2009.01)

(52) U.S. Cl.
  USPC ......... 455/411; 455/435.1; 455/436; 455/438

(58) Field of Classification Search
  USPC ................. 455/411, 435.1, 436, 438
  See application file for complete search history.

(56) References Cited

U.S. PATENT DOCUMENTS

2008/0108357 A1* 5/2008 Bot et al. ................ 455/445
2011/0035482 A1   2/2011 Lu et al.
(Continued)

FOREIGN PATENT DOCUMENTS

CN   101047709 A   10/2007
CN   101072139 A   11/2007
(Continued)

OTHER PUBLICATIONS

International Search Report and Written Opinion of the International Searching Authority issued in corresponding PCT Patent Application No. PCT/CN2010/078939, mailed Mar. 3, 2011.

(Continued)

*Primary Examiner* — Marisol Figueroa
(74) *Attorney, Agent, or Firm* — Brinks Hofer Gilson & Lione

(57) ABSTRACT

The present invention discloses a method, a device, and a system for network exit or de-registration of a femto base station. The network exit method includes: performing, a de-registration procedure with an access gateway; de-authenticating the femto base station through a security gateway and an authentication server; and tearing down a tunnel between the femto base station and the security gateway. The de-registration method includes: receiving, a de-register request message from an access gateway, where the de-register request message carries a first identifier of a neighboring base station or/and a second identifier of an access gateway other than the access gateway; directing a terminal currently served by the femto base station itself to hand over to the neighboring base station corresponding to the first identifier or/and registering with the other access gateway corresponding to the second identifier; and sending a de-register response message to the access gateway.

9 Claims, 11 Drawing Sheets

(56) References Cited

U.S. PATENT DOCUMENTS

2011/0069659 A1* 3/2011 Kong et al. .................. 370/328
2011/0250868 A1 10/2011 Peng et al.

FOREIGN PATENT DOCUMENTS

| CN | 101400154 A | 4/2009 |
| CN | 101453765 A | 6/2009 |
| CN | 101577634 A | 11/2009 |
| CN | 101577988 A | 11/2009 |
| CN | 101772188 A | 7/2010 |

OTHER PUBLICATIONS

WiMAX Forum, "WiMAX Forum Network Architecture: SON" NWG Release 1.6, Sep. 15, 2009.
WiMAX Forum, "WiMAX Forum Network Architecture: Femtocells" NWG Release 1.6, Sep. 30, 2009.
Office Action issued in corresponding Chinese Patent Application No. 201010003874.4, mailed Apr. 3, 2013.

* cited by examiner

METHOD, DEVICE, AND SYSTEM FOR NETWORK EXIT OR DE-REGISTRATION OF FEMTO BASE STATION

CROSS-REFERENCE TO RELATED APPLICATIONS

This application is a continuation of International Application No. PCT/CN2010/078939, filed on Nov. 22, 2010, which claims priority to Chinese Patent Application No. 201010003874.4, filed with the Chinese Patent Office on Jan. 9, 2010 and entitled "METHOD, DEVICE, AND SYSTEM FOR NETWORK EXIT OR DE-REGISTRATION OF FEMTO BASE STATION", both of which are incorporated herein by reference in their entireties.

FIELD OF THE INVENTION

The present invention relates to the field of wireless communication, and in particular, to a method, a device, and a system for network exit or de-registration of a femto base station.

BACKGROUND OF THE INVENTION

WiMAX (Worldwide Interoperability for Microwave Access, Worldwide Interoperability for Microwave Access) is a newly emerging broadband radio access technology. Due to the joint influence of its high data rate, long distance transmission, and the penetration fading of radio signals caused by buildings, there are certain blind areas for the signals and the quality of indoor communication is poor. As an important means of blind area coverage and indoor coverage, the WFAP (WiMAX Femto Access Point, WiMAX Femto Access Point), also known as a WiMAX femto base station, is increasingly becoming a focus of concern.

At present, the industry has founded a WiMAX femto base station working group specially to discuss the network architecture, control, management, and operation mechanism of the WFAP, and has drafted a standard for the network entry procedure of WiMAX femto base stations. The prior art, however, does not give a solution on how a WiMAX femto base station exits from the network, which causes waste of network resources and lower the network efficiency.

SUMMARY OF THE INVENTION

To save network resources and increase the efficiency and utilization of the network, embodiments of the present invention provide a method, a device, and a system for network exit or de-registration of a femto base station. The technical solution is as follows:

A method for network exit of a femto base station includes:
performing, by the femto base station, a de-registration procedure with an access gateway;
de-authenticating the femto base station through a security gateway and an authentication server; and
tearing down a tunnel between the femto base station and the security gateway.

A method for de-registration of a femto base station includes:
receiving, by the femto base station, a de-register request message from an access gateway, where the de-register request message carries a first identifier of a neighboring base station or/and a second identifier of an access gateway other than the access gateway;
directing a terminal currently served by the femto base station itself to the neighboring base station corresponding to the first identifier; or/and
registering with the other access gateway corresponding to the second identifier; and
sending a de-register response message to the access gateway.

A method for de-registration of a femto base station includes:
sending, by an access gateway, a de-register request message to the femto base station, where the de-register request message carries a first identifier of a neighboring base station or/and a second identifier of an access gateway other than the access gateway; and
receiving a de-register response message from the femto base station.

A femto base station includes:
a first de-registering module, configured to perform a de-registration procedure with an access gateway;
a first de-authenticating module, configured to de-authenticate the femto base station through a security gateway and an authentication server; and
a tunnel tearing-down module, configured to tear down a tunnel between the femto base station and the security gateway in the first de-authenticating module.

An access gateway includes:
a second de-registering module, configured to perform a de-registration procedure with a femto base station; and
a second de-authenticating module, configured to de-authenticate the femto base station in the second de-registering module through a security gateway and an authentication server.

A femto base station includes:
a first de-registration request module, configured to receive a de-register request message from an access gateway, where the de-register request message carries a first identifier of a neighboring base station or/and a second identifier of an access gateway other than the access gateway;
an access handover module, configured to direct a terminal currently served by the femto base station itself to hand over to the neighboring base station corresponding to the first identifier in the first de-registration request module or/and register the femto base station with the other access gateway corresponding to the second identifier in the first de-registration request module; and
a first de-registration response module, configured to send a de-register response message to the access gateway.

An access gateway includes:
a second de-registration request module, configured to send a de-register request message to a femto base station, where the de-register request message carries a first identifier of a neighboring base station or/and a second identifier of an access gateway other than the access gateway; and
a second de-registration response module, configured to receive a de-register response message from the base station in the second de-registration request module.

A system for network exit of a femto base station includes a femto base station and an access gateway, where:
the femto base station includes:
a first de-registering module, configured to perform a de-registration procedure with the access gateway;
a first de-authenticating module, configured to de-authenticate the femto base station through a security gateway and an authentication server; and
a tunnel tearing-down module, configured to tear down a tunnel between the femto base station and the security gateway in the first de-authenticating module; and the access gateway includes:

a second de-registering module, configured to perform the de-registration procedure with the femto base station; and a second de-authenticating module, configured to de-authenticate the femto base station in the second de-registering module through the security gateway and the authentication server.

A system for de-registration of a femto base station includes a femto base station and an access gateway, where:

the access gateway is configured to send a de-register request message to the femto base station, where the de-register request message carries a first identifier of a neighboring base station or/and a second identifier of an access gateway other than the access gateway;

the femto base station is configured to receive the de-register request message sent by the access gateway and direct a terminal currently served by the femto base station itself to hand over to the neighboring base station corresponding to the first identifier, or/and register with the other access gateway corresponding to the second identifier; and the femto base station is further configured to send a de-register response message to the access gateway and the access gateway is further configured to receive the de-register response message from the femto base station.

The technical solution provided in the embodiments of the present invention provides the following benefits:

When a femto base station exits from the network, related entities such as a management entity, security gateway, access gateway, and authentication server in the network are triggered to release network resources occupied when the femto base station enters the network. In this way, network resources that are not required are released in time, network resources are saved, and the efficiency and utilization of the network are increased.

When the femto base station is de-registered, by using the first identifier of a neighboring base station or/and the second identifier of another access gateway sent by the access gateway, the femto base station directs a terminal currently served by the femto base station itself to hand over to the neighboring base station corresponding to the first identifier or/and registers with the other access gateway corresponding to the second identifier, therefore preventing the interruption of communication and ensuring the continuity of communication.

DETAILED DESCRIPTION OF THE EMBODIMENTS

To make the purpose, technical solution, and advantages of the present invention clearer, the embodiments of the present invention are hereinafter described in detail with reference to the accompanying drawings.

Figure 1:
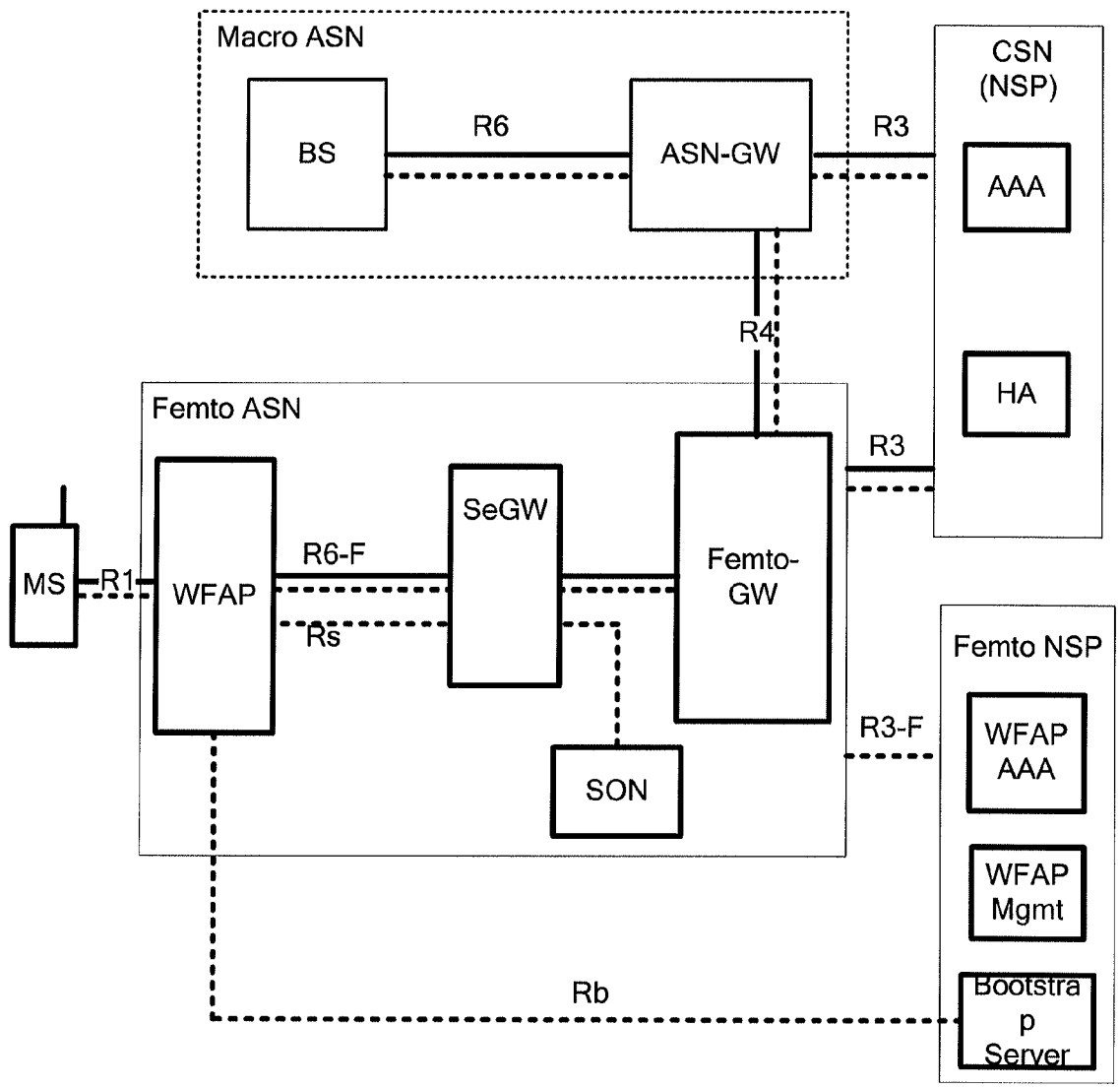
FIG. 1 is a reference model of a WiMAX network provided in a prior art.

A reference model of a WiMAX network is shown in FIG. 1, including a Femto ASN (Femto Access Service Network, femto access service network), a Macro (macro) ASN, a CSN (Connect Server Network, connect server network), an NSP (Network Service Provider, network service provider), and a Femto NSP. The Femto ASN includes a WFAP, a SeGW (Secure Gateway, security gateway), a FeGW (Femto Gateway, femto gateway), and a SON server (Self-organized Network, self-organized network server). The FeGW is also known as a femto access gateway and the WFAP is connected to the FeGW through the SeGW. The Macro ASN includes a BS (Base Station, base station), which is also known as a macro base station, and an ASN-GW (Gateway, gateway). The CSN NSP includes an AAA server (Authentication Authorization Accounting server, authentication, authorization, and accounting server) and a HA (Home Agent, home agent). The Femto NSP includes a WFAP AAA server, a WFAP Mgmt server (Management server, management server), and a Bootstrap Server (bootstrap server).

The method provided in the embodiments of the present invention is applicable to but not limited to WiMAX networks. When the method is applied to a WiMAX network, the WFAP is equivalent to the femto base station in the embodiments of the present invention, the SON server is equivalent to the management entity in the embodiments of the present invention, the SeGW is equivalent to the security gateway in the embodiments of the present invention, the FeGW is equivalent to the access gateway in the embodiments of the present invention, and the WFAP AAA is equivalent to the authentication server in the embodiments of the present invention.

Embodiment 1

Figure 2:
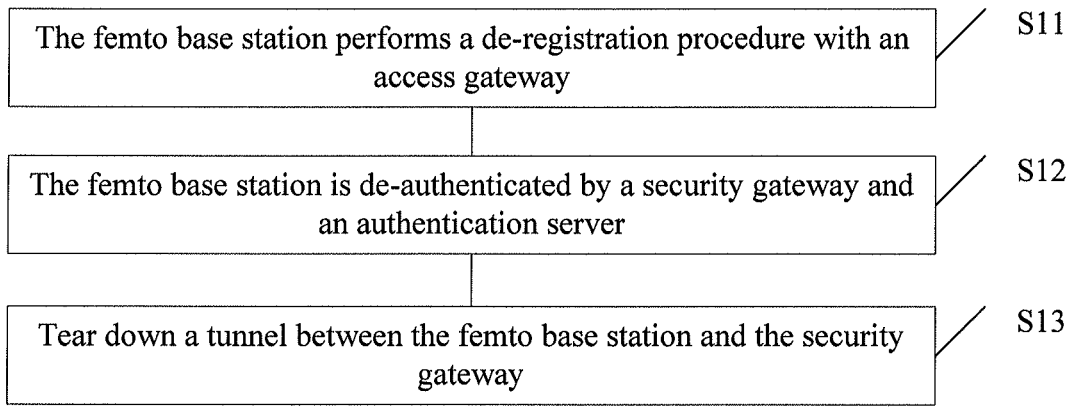
FIG. 2 is a flowchart of a method for network exit of a femto base station according to a first embodiment of the present invention.

As shown in FIG. 2, this embodiment provides a method for network exit of a femto base station, including the following steps:

S11: The femto base station performs a de-registration procedure with an access gateway.

S12: The femto base station is de-authenticated by a security gateway and an authentication server.

S13: Tear down the tunnel between the femto base station and the security gateway.

Figure 3:
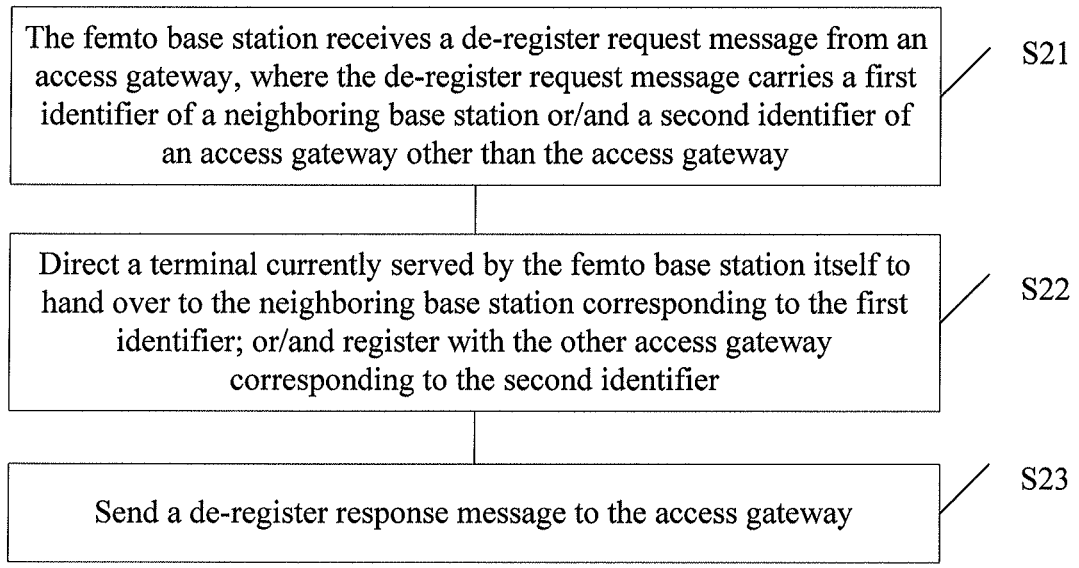
FIG. 3 is a flowchart of a method for de-registration of a femto base station according to the first embodiment of the present invention.

As shown in FIG. 3, the embodiment also provides a method for de-registration of the femto base station. With regard to the femto base station, the method includes th e following steps:

S21: The femto base station receives a de-register request message sent by the access gateway, where the de-register request message carries a first identifier of a neighboring base station or/and a second identifier of an access gateway other than the access gateway.

S22: Direct a terminal currently served by the femto base station itself to hand over to the neighboring base station corresponding to the first identifier or/and register with the other access gateway corresponding to the second identifier.

S23: Send a de-register response message to the access gateway.

Figure 4:
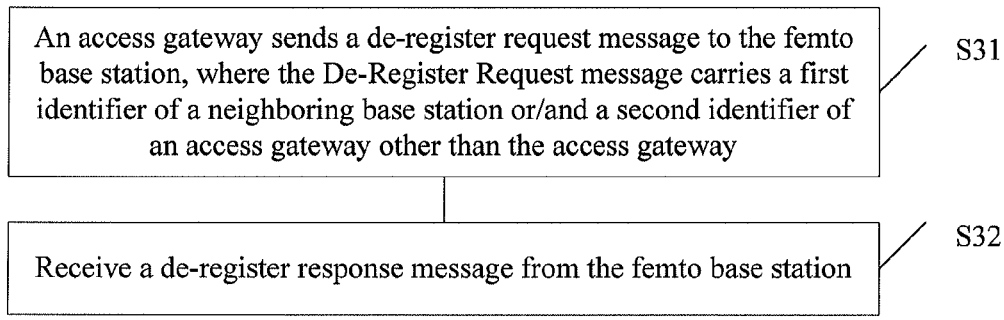
FIG. 4 is another flowchart of the method for de-registration of a femto base station according to the first embodiment of the present invention.

As shown in FIG. 4, with regard to the access gateway, the method for de-registration of the femto base station includes the following steps:

S31: The access gateway sends a de-register request message to the femto base station, where the de-register request message carries a first identifier of a neighboring base station or/and a second identifier of an access gateway other than the access gateway.

S32: Receive a de-register response message from the femto base station.

According to the method for network exit of a femto base station provided in the embodiment, related entities such as a management entity, a security gateway, an access gateway, and an authentication server in the network are triggered to release network resources occupied when the femto base station enters the network. In this way, network resources that are not required are released in time, network resources are saved, and the efficiency and utilization of the network are increased.

According to the method for de-registration of a femto base station provided in the embodiment, by using the first identifier of a neighboring base station or/and the second identifier of another access gateway sent by the access gateway, the femto base station directs a terminal currently served by the femto base station itself to hand over to the neighboring base station corresponding to the first identifier or/and registers with the other access gateway corresponding to the second identifier, therefore preventing the interruption of communication and ensuring the continuity of communication.

Embodiment 2

Figure 5:
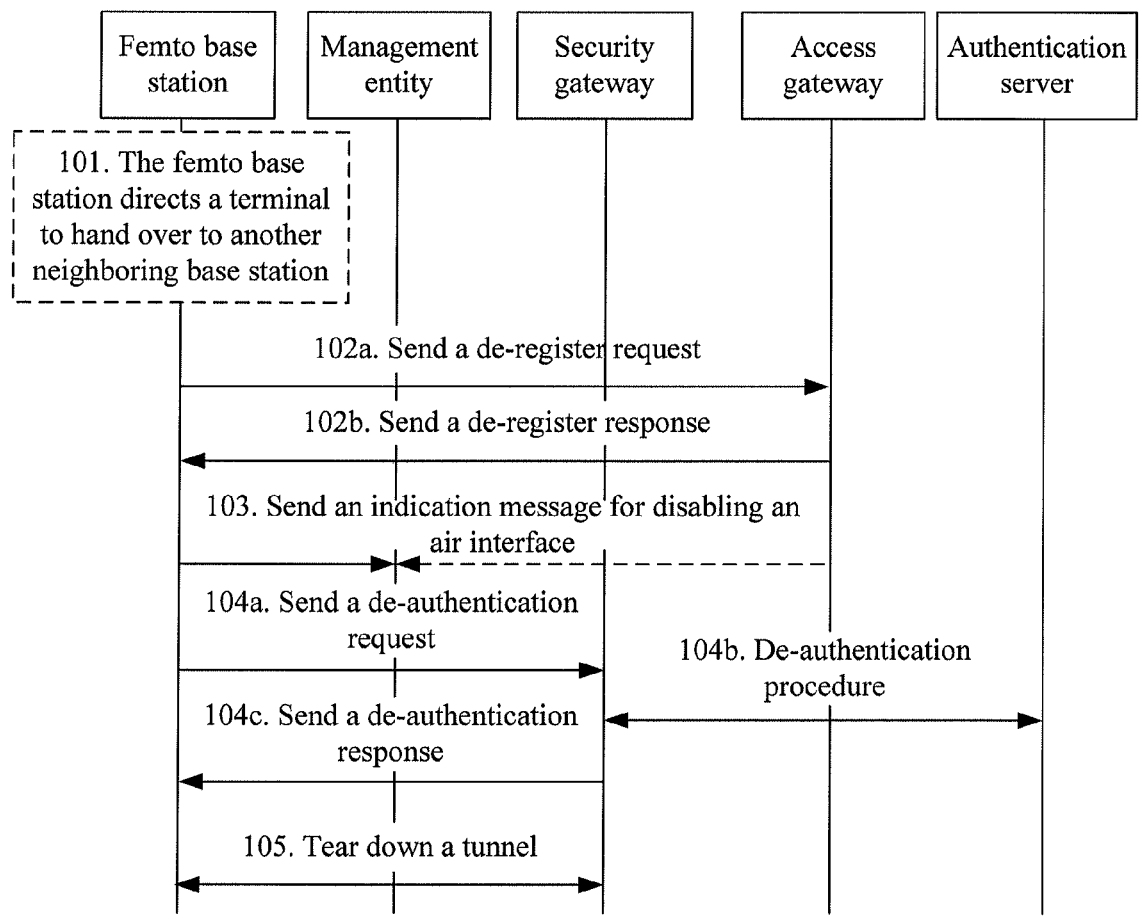
FIG. 5 is a flowchart of a method for network exit of a femto base station according to a second embodiment of the present invention.

As shown in FIG. 5, this embodiment provides a method for network exit of a femto base station, where the femto base station initiates an exit procedure. The method includes steps 101-105.

101: Before the femto base station exits from the network, if the femto base station is providing an access service to a terminal, the femto base station may direct the terminal to hand over to a neighboring base station other than the femto base station.

Specifically, the directing method includes the following steps:

101a: The femto base station sends a handover request message to a currently served terminal, where the handover request message includes information about other neighboring base stations.

The other neighboring base stations are the handover target base stations that the femto base station suggests for the terminal served by the femto base station. There may be one or more such neighboring base stations, which may be femto base stations or macro base stations.

101b: After receiving the handover request message, the terminal decides a handover target base station according to the information about other neighboring base stations that is carried in the handover request message and the information about nearby base stations that is obtained by the terminal itself, and initiates a handover to the target base station.

The information about nearby base stations that is obtained by the terminal includes but is not limited to scanned signal strength, tariff, and a roaming agreement with the operator of the current base station.

After the femto base station sends the handover request message to direct the terminal to hand over to another neighboring base station, the femto base station exits from the network according to the following exit procedure.

102: The femto base station performs a de-registration procedure with the access gateway, including the following steps:

102a: The femto base station sends a De-Register Request message to the access gateway.

The de-register request message carries identifier information of the femto base station which is described as a third identifier.

102b: The access gateway returns a corresponding De-Register Response message to the femto base station, where the message carries an indication of accepting or rejecting de-registration.

Specifically, the access gateway returns a de-register response message to the femto base station corresponding to the third identifier.

103: After the femto base station receives, from the access gateway, the de-register response message which indicates that de-registration is accepted, the femto base station stops providing the access service to the terminal, disables its air interface, and sends an indication message for disabling an air interface Disable RF Indication to the management entity.

Further, the indication message for disabling an air interface may be sent by the access gateway to the management entity. Specifically, if the access gateway accepts the de-registration request of the femto base station, the access gateway sends the indication message for disabling an air interface to the management entity.

The indication message for disabling an air interface carries identifier information of the femto base station, that is, the third identifier. After receiving the indication message for disabling an air interface from the femto base station or the access gateway, the management entity withdraws the radio spectrum resource used by the femto base station corresponding to the third identifier.

104: The femto base station is de-authenticated by a security gateway and an authentication server.

Specifically, the femto base station is de-authenticated by an authenticator of the security gateway and the authentication server. The procedure includes the following steps:

104a: The femto base station sends a De-Authentication Request message to the security gateway.

The de-authentication request message carries identifier information of the femto base station, the third identifier.

104b: The security gateway and the authentication server perform a de-authentication procedure with respect to the femto base station.

Specifically, the de-authentication procedure is implemented through the exchange of messages between the femto authenticator in the security gateway and the authentication server of the femto base station. This is similar to the message exchange procedure between a WiMAX terminal authenticator and a terminal authentication server to de-authenticate a terminal in the prior art and is not described herein.

104c. After completing the de-authentication procedure with the authentication server, the security gateway sends a De-Authentication Response message to the femto base station.

The de-authentication response message carries the result of the de-authentication operation, for example, de-authentication succeeded or de-authentication failed.

105: After receiving a de-authentication succeeded response message, the femto base station tears down a tunnel with the security gateway.

Specifically, the tunnel is an IPSec (Internet Protocol Security, Internet Protocol Security) security tunnel.

After steps 101-105, the network exit procedure of the femto base station is completed.

Figure 6:
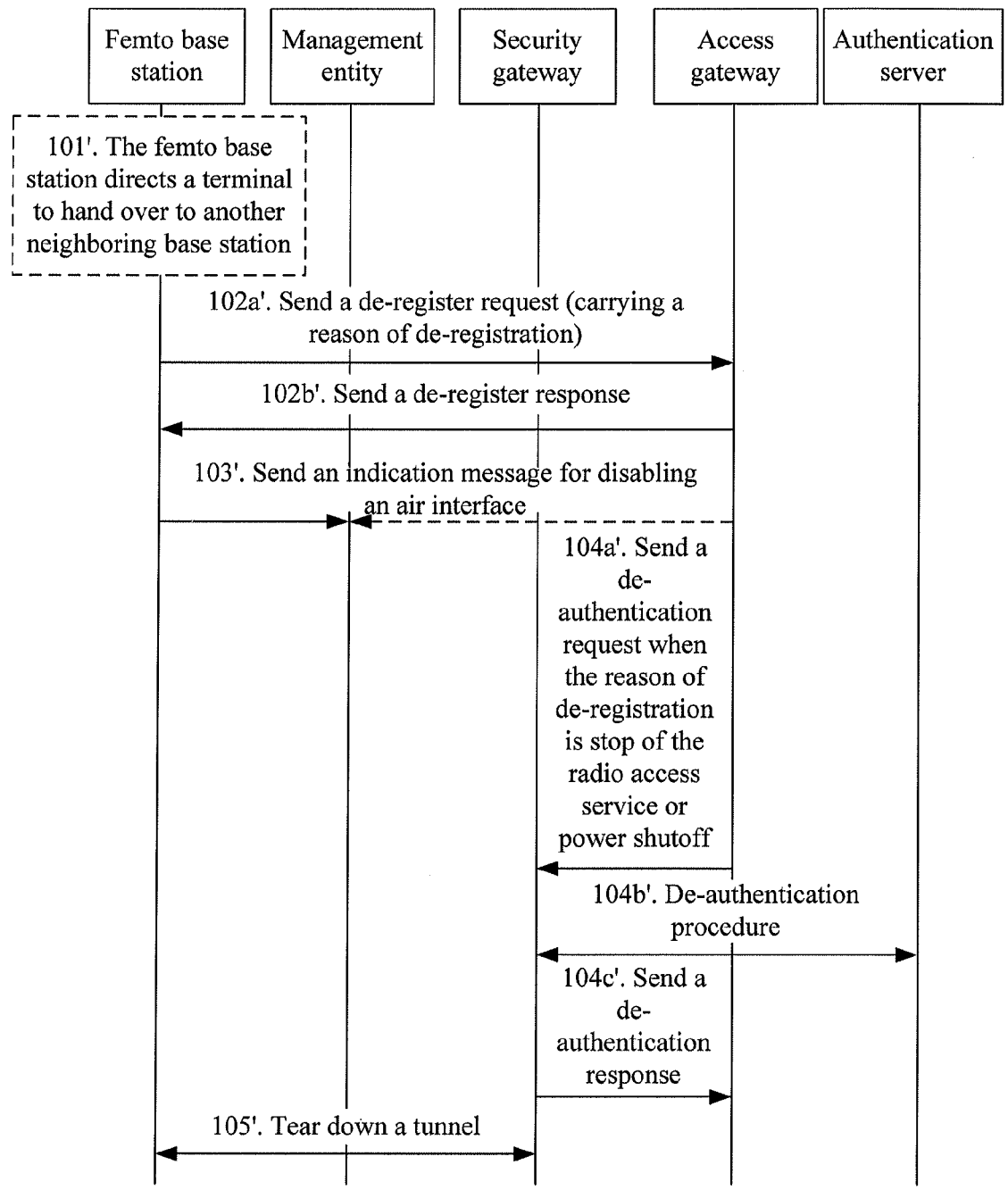
FIG. 6 is another flowchart of the method for network exit of a femto base station according to the second embodiment of the present invention.

Further, the de-authentication procedure in the network exit process of the femto base station may be performed by the access gateway through the security gateway and the authentication server. As shown in FIG. 6, this procedure includes steps 101'-105'.

101': This step is the same as step 101 and is not described herein.

102': The femto base station performs a de-registration procedure with the access gateway, including the following steps:

102a': The femto base station sends a De-Register Request message to the access gateway, where the message carries the reason of de-registration and identifier information of the femto base station, that is, the third identifier.

The reason of de-registration includes but is not limited to termination of the radio access service and power shutoff.

102b': The access gateway returns a corresponding De-Register Response message to the femto base station, where the message carries an indication of accepting or rejecting de-registration.

103': This step is the same as step 103 and is not described herein.

104': The access gateway performs a procedure of de-authenticating the femto base station through the security gateway and the authentication server according to the reason of de-registration sent by the femto base station, including the following steps:

104a': When the reason of de-registration is termination of the radio access service or power shutoff, the access gateway sends a De-Authentication Request message to the security gateway.

The de-authentication request message carries identifier information of the femto base station, that is, the third identifier.

104b': This step is the same as step 104b and is not described herein.

104c': After completing the de-authentication procedure with the authentication server, the security gateway sends a De-Authentication Response message to the access gateway.

The de-authentication response message carries the result of the de-authentication operation, for example, de-authentication succeeded or de-authentication failed.

105': After the security gateway confirms that de-authentication is successful, the security gateway tears down the tunnel with the femto base station.

According to the method for network exit of a femto base station provided in the embodiment, when the femto base station exits from the network, related entities such as a management entity, security gateway, access gateway, and authentication server in the network are triggered to release network resources occupied when the femto base station enters the network. In this way, network resources that are not required are released in time, network resources are saved, and the efficiency and utilization of the network are increased.

Embodiment 3

Figure 7:
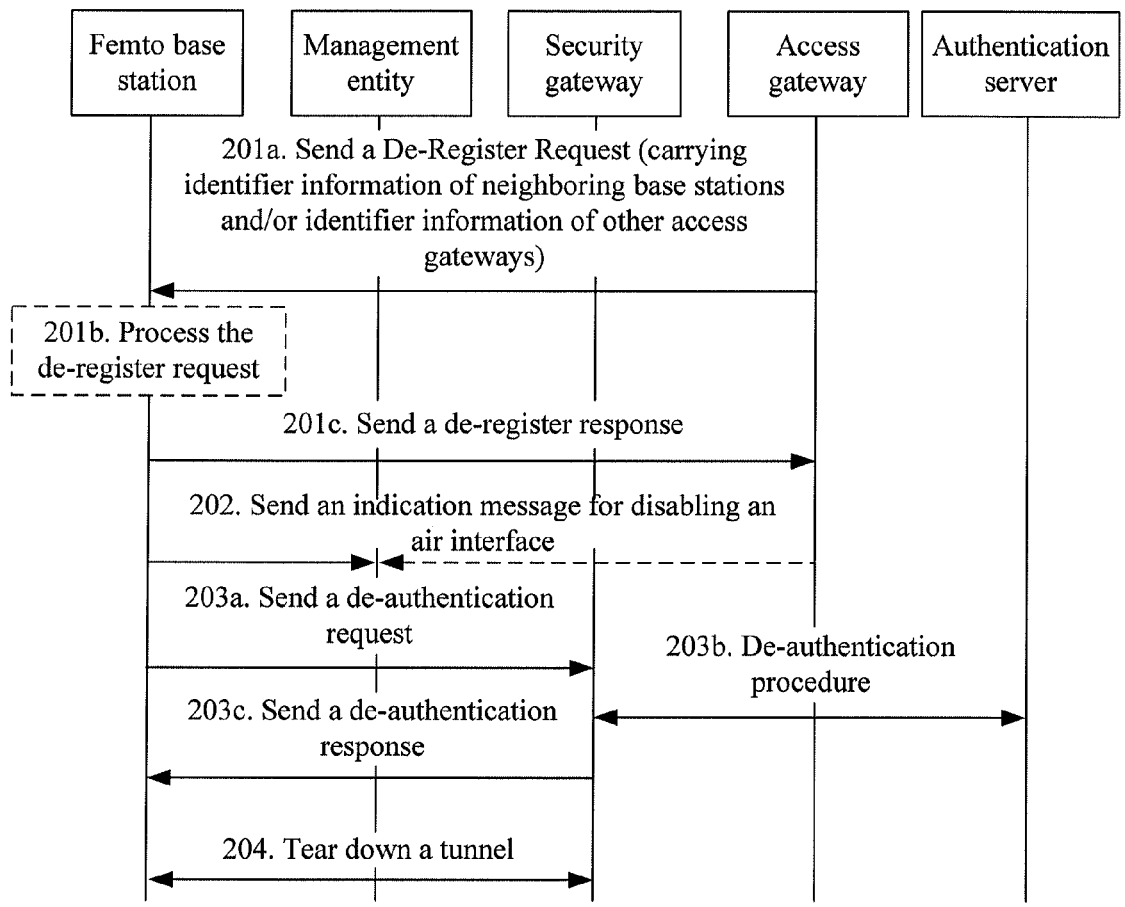
FIG. 7 is a flowchart of a method for network exit of a femto base station according to a third embodiment of the present invention.

As shown in FIG. 7, this embodiment provides a method for network exit of a femto base station, where an access gateway initiates an exit procedure. The method includes steps 201-204.

201: The femto base station performs a de-registration procedure with the access gateway, including the following steps:

201a: The access gateway sends a de-register request message to the femto base station actively, where the message carries identifier information of a neighboring base station and/or identifier information of an access gateway other than the access gateway.

The neighboring base station is a handover target base station that the access gateway suggests for the terminal served by the femto base station. There may be one or more such neighboring base stations, which may be neighboring macro base stations or neighboring femto base stations. The identifier information of neighboring base stations is defined as a first identifier.

The other access gateways are handover target gateways that the access gateway suggests for the femto base station. There may be one or more such access gateways. The identifier information of the access gateways other than the access gateway is defined as a second identifier. The second identifier may particularly be the MAC address or IP address of an access gateway.

In addition, the access gateway may initiate de-registration for reasons like overload or power shutoff or quality of service, which is not limited by the embodiment.

201b: After the femto base station receives the de-register request message, there are two handling methods:

The first method is that the femto base station re-registers with another access gateway.

Specifically, the femto base station reselects a new access gateway to perform registration according to the identifier information of other access gateways in the de-register request message. When the femto base station sends a Register Request message to the new access gateway, the Register Request message may carry identifier information of the source access gateway. In addition, the femto base station may select an access gateway except the other access gateways suggested in the de-register request message to get access.

In this handling method, the femto base station does not need to stop providing the access service to the terminal but only needs to, before or after sending the de-register response message to the current access gateway, reselect a new access gateway to perform registration.

The second handling method is that the femto base station disables its air interface and directs the terminal it is serving to a neighboring base station.

Specifically, the femto base station directs the terminal it is currently serving to hand over to an available neighboring base station by sending a handover request message to the terminal according to the identifier information of neighboring base stations in the de-register request message. In addition, the femto base station may direct the terminal it is currently serving to hand over to a base station except the neighboring base stations suggested in the de-register request message.

In this handling method, there may currently be no other access gateway available for the femto base station or, in the first handling method, the femto base station may fail to register with another access gateway.

201c: The femto base station returns a de-register response message to the access gateway, where the response message carries an indication of accepting or rejecting de-registration.

When the second handling method is adopted, the following steps are performed:

202: When the femto base station returns a de-register response message indicating that de-registration is accepted, the femto base station stops providing the access service to the terminal, disables its air interface, and sends an indication message for disabling an air interface to the management entity.

Further, the indication message for disabling an air interface may be sent by the access gateway to the management entity. Specifically, if the access gateway receives a de-register response message indicating that de-registration is accepted, the access gateway sends the indication message for disabling an air interface to the management entity.

The indication message for disabling an air interface carries identifier information of the femto base station, that is, the third identifier. After receiving the indication message for disabling an air interface from the femto base station or the access gateway, the management entity withdraws the radio spectrum resource used by the femto base station corresponding to the third identifier.

203: The femto base station is de-authenticated by the security gateway and the authentication server.

Specifically, step 203 is the same as step 104, step 203 includes 203a, 203b, and 203c which are the same as steps 104a, 104b, and 104c, respectively, which are not described herein.

204: After receiving a de-authentication succeeded response message, the femto base station tears down a tunnel with the security gateway.

Specifically, step 204 is the same as step 105 and is not described herein.

After steps 201-204, the network exit procedure of the femto base station is completed.

Figure 8:
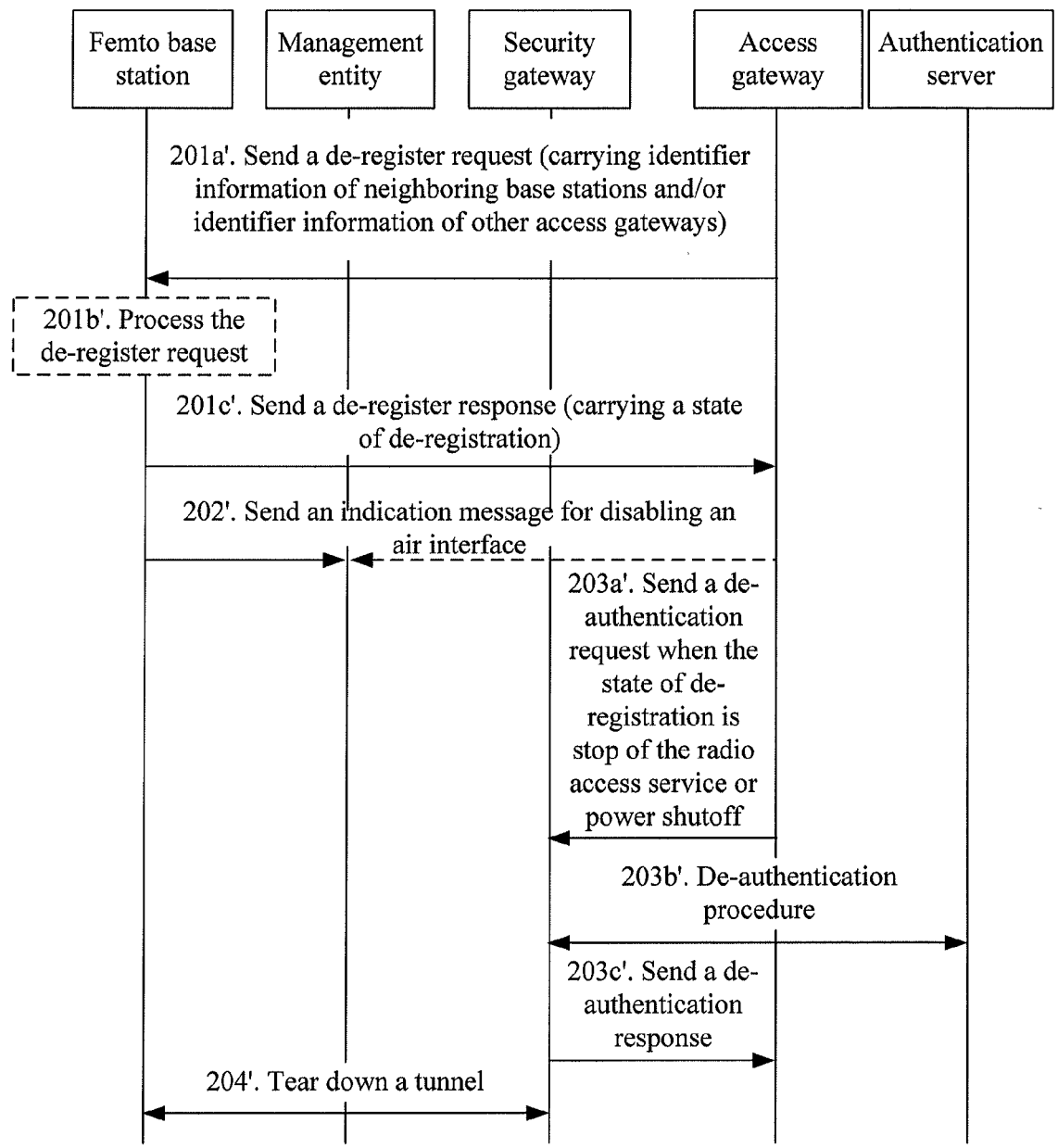
FIG. 8 is another flowchart of the method for network exit of a femto base station according to the third embodiment of the present invention.

Further, the de-authentication procedure in the network exit process of the femto base station may be performed by the access gateway through the security gateway and the authentication server. As shown in FIG. 8, this procedure includes steps 201'-204'.

201': The femto base station performs a de-registration procedure with the access gateway, including the following steps:

201a': This step is the same as step 201a and is not described herein.

201b': This step is the same as step 201b and is not described herein.

201c': The femto base station returns a de-register response message to the access gateway, where the response message carries an indication of accepting or rejecting de-registration.

Further, where the second handling method is adopted, the response message needs to carry a state of de-registration, including but not limited to stop of the radio access service and power shutoff.

202': This step is the same as step 202 and is not described herein.

203': The access gateway performs a procedure of de-authenticating the femto base station through the security gateway and the authentication server according to the state of de-registration sent by the femto base station, including the following steps:

203a': When the state of de-registration is termination of the radio access service or power shutoff, the access gateway sends a De-Authentication Request message to the security gateway.

The de-authentication request message carries identifier information of the femto base station, that is, the third identifier.

203b': This step is the same as step 104b' and is not described herein.

203c': This step is the same as step 104c' and is not described herein.

204': After the security gateway confirms that de-authentication is successful, the security gateway tears down the tunnel with the femto base station.

According to the method for network exit of a femto base station provided in the embodiment, when the femto base station exits from the network, related entities such as a management entity, a security gateway, an access gateway, and an authentication server in the network are triggered to release network resources occupied when the femto base station enters the network. In this way, network resources that are not required are released in time, network resources are saved, and the efficiency and utilization of the network are increased. In the method for de-registration of a femto base station therein, by using the first identifier of a neighboring base station or/and the second identifier of another access gateway sent by the access gateway, the femto base station directs a terminal currently served by the femto base station itself to hand over to the neighboring base station corresponding to the first identifier or/and registers with the other access gateway corresponding to the second identifier, therefore preventing the interruption of communication and ensuring the continuity of communication.

Embodiment 4

Figure 9:
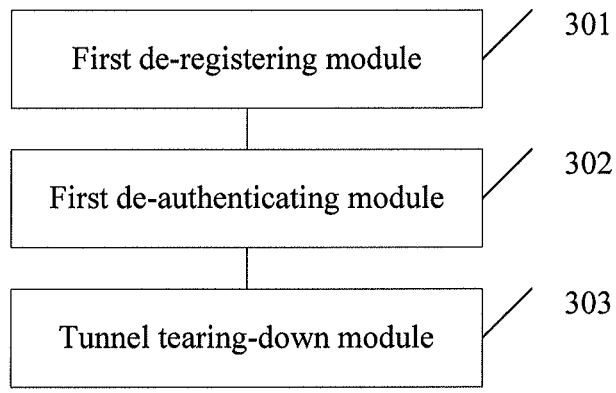
FIG. 9 is a schematic structural diagram of a femto base station according to a fourth embodiment of the present invention.

As shown in FIG. 9, this embodiment provides a femto base station, including:

a first de-registering module 301, configured to perform a de-registration procedure with an access gateway;

a first de-authenticating module 302, configured to de-authenticate the femto base station through a security gateway and an authentication server; and a tunnel tearing-down module 303, configured to tear down a tunnel between the femto base station and the security gateway in the first de-authenticating module 302.

Figure 10:
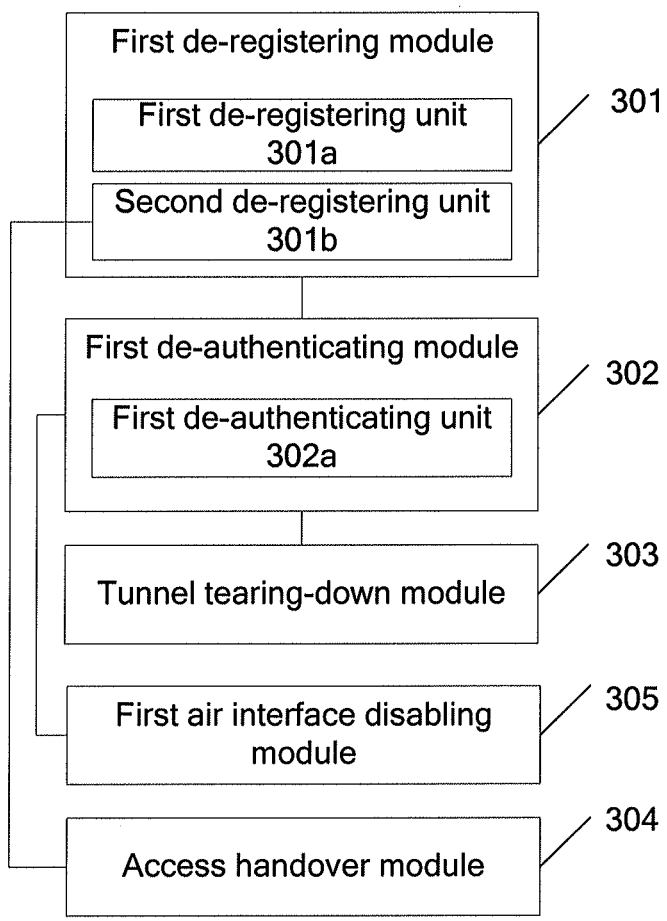
FIG. 10 is another schematic structural diagram of the femto base station according to the fourth embodiment of the present invention.

As shown in FIG. 10, in one embodiment of the present invention, the first de-registering module 301 includes:

a first de-registering unit 301a, configured to send a de-register request message to the access gateway and receive a de-register response message sent by the access gateway; or a second de-registering unit 301b, configured to receive a de-register request message sent by the access gateway and send a de-register response message to the access gateway, in which, the first de-authenticating module 302 includes a first de-authenticating unit 302a, configured to initiate a de-authentication procedure to the security gateway when the de-register response message carries an indication of accepting de-registration, so that the security gateway and the authentication server de-authenticate the femto base station.

In another embodiment, the femto base station further includes an access handover module 304, configured to: when the de-register request message carries a first identifier of a neighboring base station or/and a second identifier of an access gateway other than the access gateway, direct a terminal it is currently serving to hand over to the neighboring base station corresponding to the first identifier or/and register the femto base station with the other access gateway corresponding to the second identifier.

The femto base station further includes a first air interface disabling module 305, configured to send an indication message for disabling an air interface of the femto base station to a management entity before the femto base station is de-authenticated by the security gateway and the authentication server, where the indication message is used for the management entity to withdraw the radio spectrum resource used by the femto base station after receiving the indication message.

The femto base station provided in the embodiment, when exiting from the network, triggers related entities such as a management entity, a security gateway, an access gateway, and an authentication server in the network to release network resources occupied when the femto base station enters the network. In this way, network resources that are not required are released in time, network resources are saved, and the efficiency and utilization of the network are increased. In the method for de-registration of a femto base station therein, by using the first identifier of a neighboring base station or/and the second identifier of another access gateway sent by the access gateway, the femto base station directs a terminal currently served by the femto base station itself to hand over to the neighboring base station corresponding to the first identifier or/and registers with the other access gateway corresponding to the second identifier, therefore preventing the interruption of communication and ensuring the continuity of communication.

Embodiment 5

Figure 11:
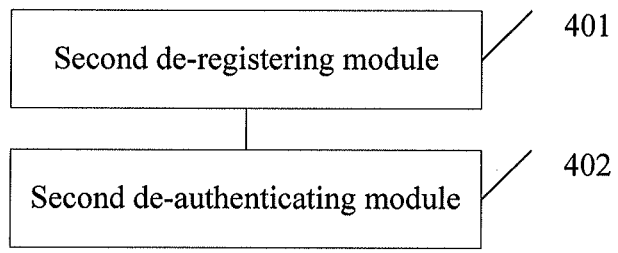
FIG. 11 is a schematic structural diagram of an access gateway according to a fifth embodiment of the present invention.

As shown in FIG. 11, this embodiment provides an access gateway, including:

a second de-registering module 401, configured to perform a de-registration procedure with a femto base station; and a second de-authenticating module 402, configured to de-authenticate the femto base station in the second de-registering module 401 through a security gateway and an authentication server.

Figure 12:
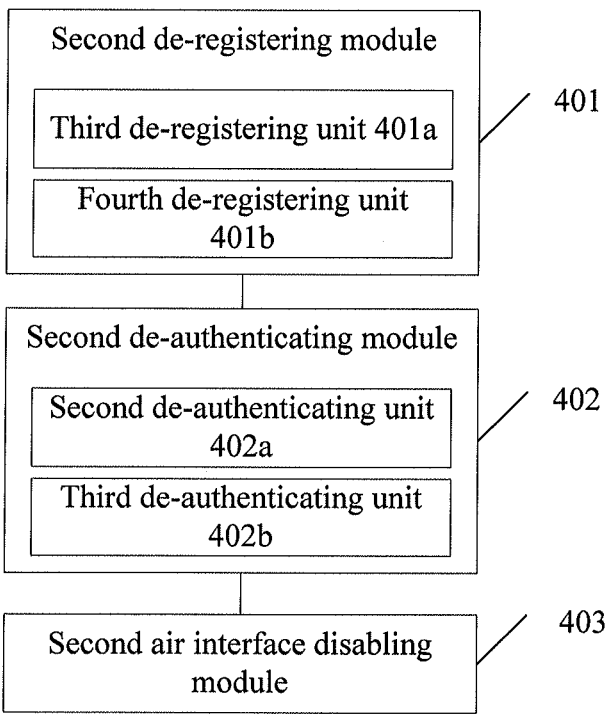
FIG. 12 is another schematic structural diagram of the access gateway according to the fifth embodiment of the present invention.

As shown in FIG. 12, the second de-registering module 401 includes:

a third de-registering unit 401a, configured to receive a de-register request message from the femto base station and send a de-register response message to the femto base station; or a fourth de-registering unit 401b, configured to send a de-register request message to the femto base station and receive a de-register response message from the femto base station.

The second de-authenticating module 402 includes:

a second de-authenticating unit 402a, configured to initiate a de-authentication procedure to the security gateway when the de-register request message carries a reason of de-registration which is termination of the radio access service or power shutoff, and the de-register response message carries an indication of accepting de-registration, so that the security gateway and the authentication server de-authenticate the femto base station; or a third de-authenticating unit 402b, configured to initiate a de-authentication procedure to the security gateway when the de-register response message carries a state of de-registration which is termination of the radio access service or power shutoff and carries an indication of accepting de-registration, so that the security gateway and the authentication server de-authenticate the femto base station.

The de-register request message carries a first identifier of a neighboring base station or/and a second identifier of an access gateway other than the access gateway, so that the femto base station directs a terminal it is currently serving to hand over to the neighboring base station corresponding to the first identifier or/and registers with the other access gateway corresponding to the second identifier.

The access gateway may further include a second air interface disabling module 403, configured to send an indication message for disabling an air interface of the femto base station to a management entity before the femto base station is de-authenticated by the security gateway and the authentication server, where the indication message is used for the management entity to withdraw the radio spectrum resource used by the femto base station after receiving the indication message.

The access gateway provided in the embodiment, when a femto base station exits from the network, triggers related entities such as a management entity, security gateway, access gateway, and authentication server in the network to release network resources occupied when the femto base station enters the network. In this way, network resources that are not required are released in time, network resources are saved, and the efficiency and utilization of the network are increased. In the method for de-registration of a femto base station therein, by using the first identifier of a neighboring base station or/and the second identifier of another access gateway sent by the access gateway, the femto base station directs a terminal currently served by the femto base station itself to hand over to the neighboring base station corresponding to the first identifier or/and registers with the other access gateway corresponding to the second identifier, therefore preventing the interruption of communication and ensuring the continuity of communication.

Embodiment 6

Figure 13:
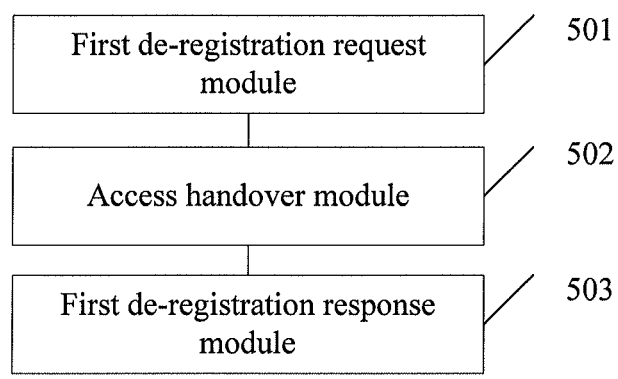
FIG. 13 is a schematic structural diagram of a femto base station according to a sixth embodiment of the present invention.

As shown in FIG. 13, this embodiment provides a femto base station, including:

a first de-registration request module 501, configured to receive a de-register request message from an access gateway, where the de-register request message carries a first identifier of a neighboring base station or/and a second identifier of an access gateway other than the access gateway;

an access handover module 502, configured to direct a terminal currently served by the femto base station itself to hand over to the neighboring base station corresponding to the first identifier in the first de-registration request module 501 or/and register with the other access gateway corresponding to the second identifier in the first de-registration request module 501; and a first de-registration response module 503, configured to send a de-register response message to the access gateway.

Figure 14:
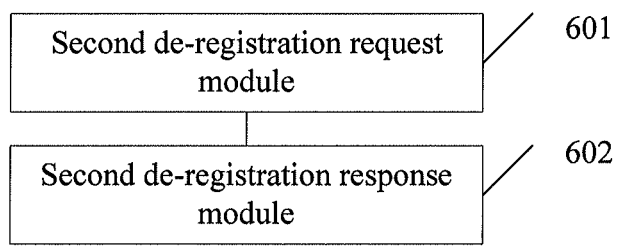
FIG. 14 is a schematic structural diagram of an access gateway according to the sixth embodiment of the present invention.

Accordingly, as shown in FIG. 14, this embodiment provides an access gateway, including:

a second de-registration request module 601, configured to send a de-register request message to a femto base station, where the de-register request message carries a first identifier of a neighboring base station or/and a second identifier of an access gateway other than the access gateway; and a second de-registration response module 602, configured to receive a de-register response message from the base station in the second de-registration request module 601.

By using the first identifier of a neighboring base station or/and the second identifier of another access gateway sent by the access gateway provided in the embodiment, the femto base station provided in the embodiment directs a terminal currently served by the femto base station itself to hand over to the neighboring base station corresponding to the first identifier or/and registers with the other access gateway corresponding to the second identifier, therefore preventing the interruption of communication and ensuring the continuity of communication.

Embodiment 7

Figure 15:
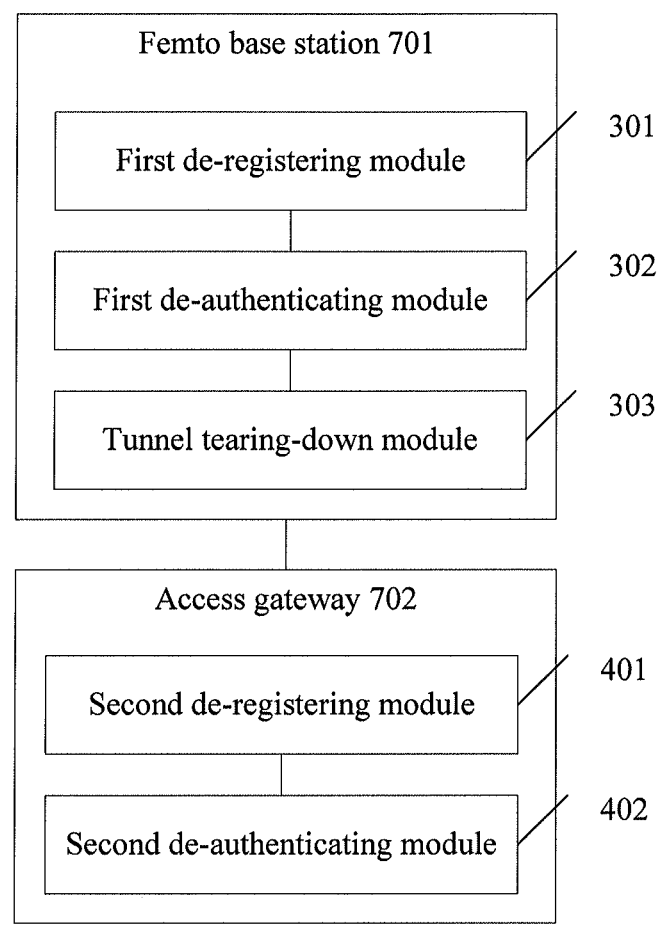
FIG. 15 is a schematic diagram of a system for network exit of a femto base station according to a seventh embodiment of the present invention.

As shown in FIG. 15, this embodiment provides a system for network exit of a femto base station, including a femto base station 701 and an access gateway 702.

The femto base station includes:

a first de-registering module 301, configured to perform a de-registration procedure with the access gateway;

a first de-authenticating module 302, configured to de-authenticate the femto base station through a security gateway and an authentication server; and a tunnel tearing-down module 303, configured to tear down a tunnel between the femto base station and the security gateway in the first de-authenticating module 302.

The access gateway includes:

a second de-registering module 401, configured to perform a de-registration procedure with the femto base station; and a second de-authenticating module 402, configured to de-authenticate the femto base station in the second de-registering module 401 through the security gateway and the authentication server.

Figure 16:
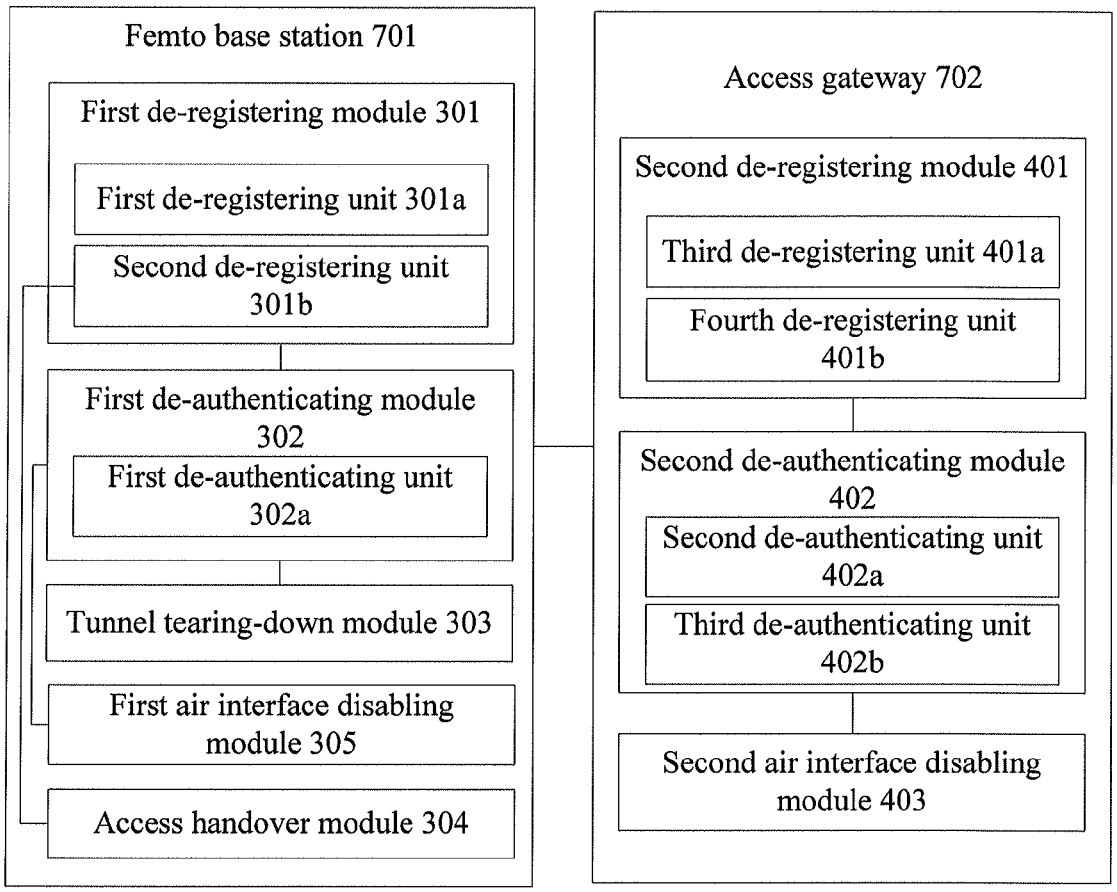
FIG. 16 is another schematic diagram of the system for network exit of a femto base station according to the seventh embodiment of the present invention.

As shown in FIG. 16, the first de-registering module 301 includes a first de-registering unit 301*a* or a second de-registering unit 301*b*.

The first de-registering unit 301*a* is configured to send a de-register request message to the access gateway 702 and receive a de-register response message sent by the access gateway 702.

The second de-registering unit 301*b* is configured to receive a de-register request message sent by the access gateway 702 and send a de-register response message to the access gateway 702.

The first de-authenticating module 302 includes a first de-authenticating unit 302*a*, configured to initiate a de-authentication procedure to the security gateway for the femto base station 701 when the de-register response message carries an indication of accepting de-registration, so that the security gateway and the authentication server de-authenticate the femto base station 701.

The femto base station 701 further includes an access handover module 304, configured to: when the de-register request message in the second de-registering unit 301*b* carries a first identifier of a neighboring base station or/and a second identifier of an access gateway 702 other than the access gateway 702, direct a terminal it is currently serving to hand over to the neighboring base station corresponding to the first identifier or/and register the femto base station 701 with the other access gateway 702 corresponding to the second identifier.

The femto base station 701 further includes a first air interface disabling module 305, configured to send an indication message for disabling an air interface of the femto base station to a management entity before the femto base station 701 is de-authenticated by the security gateway and the authentication server, where the indication message is used for the management entity to withdraw the radio spectrum resource used by the femto base station after receiving the indication message.

The second de-registering module 401 includes:

a third de-registering unit 401*a*, configured to receive a de-register request message from the femto base station 701 and send a de-register response message to the femto base station 701; or a fourth de-registering unit 401*b*, configured to send a de-register request message to the femto base station 701 and receive a de-register response message from the femto base station 701.

The second de-authenticating module 402 includes:

a second de-authenticating unit 402*a*, configured to initiate a de-authentication procedure to the security gateway when the de-register request message of the third de-registering unit 401*a* carries a reason of de-registration which is termination of the radio access service or power shutoff and the de-register response message of the third de-registering unit 401*a* carries an indication of accepting de-registration, so that the security gateway and the authentication server de-authenticate the femto base station 701; or a third de-authenticating unit 402*b*, configured to initiate a de-authentication procedure to the security gateway when the de-register response message of the fourth de-registering unit 401*b* carries a state of de-registration which is termination of the radio access service or power shutoff and carries an indication of accepting de-registration, so that the security gateway and the authentication server de-authenticate the femto base station 701.

The access gateway 702 includes:

a second air interface disabling module 403, configured to send an indication message for disabling an air interface to the management entity before the femto base station 701 is de-authenticated by the security gateway and the authentication server, where the indication message is used for the management entity to withdraw the radio spectrum resource used by the femto base station after receiving the indication message.

The system provided in the embodiment, when a femto base station exits from the network, triggers related entities such as a management entity, security gateway, access gateway, and authentication server in the network to release network resources occupied when the femto base station enters the network. In this way, network resources that are not required are released in time, network resources are saved, and the efficiency and utilization of the network are increased. In the femto base station de-registration procedure therein, by using the first identifier of a neighboring base station or/and the second identifier of another access gateway, the femto base station directs a terminal currently served by the femto base station itself to hand over to the neighboring base station corresponding to the first identifier or/and registers with the other access gateway corresponding to the second identifier, therefore preventing the interruption of communication and ensuring the continuity of communication.

Embodiment 8

Figure 17:
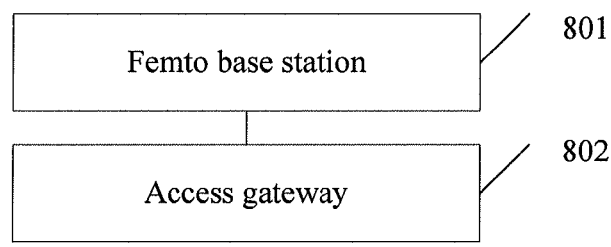
FIG. 17 is a schematic diagram of a system for network exit of a femto base station according to an eighth embodiment of the present invention.

As shown in FIG. 17, this embodiment provides a system for de-registration of a femto base station, including a femto base station 801 and an access gateway 802.

The access gateway 802 is configured to send a de-register request message to the femto base station 801, where the de-register request message carries a first identifier of a neighboring base station or/and a second identifier of an access gateway 802 other than the access gateway 802.

The femto base station 801 is configured to receive the de-register request message sent by the access gateway 802 and direct a terminal currently served by the femto base station 801 itself to hand over to the neighboring base station corresponding to the first identifier, or/and register with the other access gateway 802 corresponding to the second identifier.

The femto base station 801 is further configured to send a de-register response message to the access gateway 802 and the access gateway 802 is further configured to receive the de-register response message from the femto base station 801.

The system provided in the embodiment, by using the first identifier of a neighboring base station or/and the second identifier of another access gateway, directs a terminal it is currently serving to hand over to the neighboring base station corresponding to the first identifier or/and registers with the other access gateway corresponding to the second identifier, therefore preventing the interruption of communication and ensuring the continuity of communication.

All or a portion of contents in the technical solution provided in the foregoing embodiments of the present invention may be implemented through software programming, where the software program is stored in a computer readable storage medium, such as a hard disk, CD-ROM, floppy disk, or flash (Flash) memory in a computer.

Although the present invention has been described in detail through some exemplary embodiments, the present invention is not limited to such embodiments. Any modifications, substitutions, and improvements within the spirit and principle of the present invention shall be included in the scope of the present invention.

What is claimed is:

1. A method for network exit of a femto base station, comprising:
    performing, by the femto base station, a de-registration procedure with an access gateway;
    de-authenticating the femto base station through a security gateway and an authentication server;
    before the de-authenticating the femto base station through the security gateway and the authentication server, sending an indication message for disabling an air interface of the femto base station to a management entity, wherein the indication message is used for the management entity to withdraw a radio spectrum resource used by the femto base station after the management entity receives the indication message; and
    tearing down a tunnel between the femto base station and the security gateway.

2. A method for network exit of a femto base station, comprising:
    performing, by the femto base station, a de-registration procedure with an access gateway;
    de-authenticating the femto base station through a security gateway and an authentication server; and
    tearing down a tunnel between the femto base station and the security gateway;
    wherein the performing, by the femto base station, the de-registration procedure with the access gateway comprises one of:
    sending, by the femto base station, a de-register request message to the access gateway and receiving a de-register response message sent by the access gateway; or
    receiving, by the femto base station, a de-register request message sent by the access gateway and sending a de-register response message to the access gateway;
    wherein, when the de-register request message sent by the access gateway carries a first identifier of a neighboring base station or/and a second identifier of an access gateway other than the current access gateway, and
    the femto base station directs a terminal it is currently serving to hand over to the neighboring base station corresponding to the first identifier or/and the femto base station registers with the other access gateway corresponding to the second identifier.

3. The method according to claim 2, wherein the de-authenticating the femto base station through the security gateway and the authentication server comprises one of:
    when the de-register response message carries an indication of accepting de-registration, initiating, by the femto base station, a de-authentication procedure to the security gateway so that the security gateway and the authentication server de-authenticate the femto base station; or
    when the de-register request message sent by the femto base station carries a reason of de-registration which is termination of a radio access service or power shutoff and the de-register response message sent by the access gateway carries an indication of accepting de-registration, initiating, by the access gateway, a de-authentication procedure to the security gateway so that the security gateway and the authentication server de-authenticate the femto base station; or
    when the de-register response message sent by the femto base station carries a state of de-registration which is termination of a radio access service or power shutoff and carries an indication of accepting de-registration, initiating, by the access gateway, a de-authentication procedure to the security gateway so that the security gateway and the authentication server de-authenticate the femto base station.

4. A femto base station, comprising:
    a first de-registering module, configured to perform a de-registration procedure with an access gateway;
    a first de-authenticating module, configured to de-authenticate the femto base station through a security gateway and an authentication server;
    a tunnel tearing-down module, configured to tear down a tunnel between the femto base station and the security gateway in the first de-authenticating module; and
    an access handover module, configured to: when the de-register request message carries a first identifier of a neighboring base station or/and a second identifier of an access gateway other than the access gateway, direct a terminal currently served by the femto base station itself to hand over to the neighboring base station corresponding to the first identifier or/and register the femto base station with the other access gateway corresponding to the second identifier;
    wherein the first de-registering module comprises one of:
    a first de-registering unit, configured to send a de-register request message to the access gateway and receive a de-register response message sent by the access gateway; or
    a second de-registering unit, configured to receive a de-register request message sent by the access gateway and send a de-register response message to the access gateway.

5. The femto base station according to claim 4, wherein the first de-authenticating module comprises: a first de-authenticating unit, configured for the femto base station to initiate a de-authentication procedure to the security gateway when the de-register response message carries an indication of accepting de-registration, so that the security gateway and the authentication server de-authenticate the femto base station.

6. A femto base station, comprising:
a first de-registering module, configured to perform a de-registration procedure with an access gateway;
a first de-authenticating module, configured to de-authenticate the femto base station through a security gateway and an authentication server; and
a tunnel tearing-down module, configured to tear down a tunnel between the femto base station and the security gateway in the first de-authenticating module; and
a first air interface disabling module, configured to send an indication message for disabling an air interface of the femto base station to a management entity before the femto base station is de-authenticated by the security gateway and the authentication sever, wherein the indication message is used for the management entity to withdraw a radio spectrum resource used by the femto base station after the management entity receives the indication message.

7. An access gateway, comprising:
a second de-registering module, configured to perform a de-registration procedure with a femto base station; and
a second de-authenticating module, configured to de-authenticate the femto base station in the second de-registering module through a security gateway and an authentication server;
wherein the second de-registering module comprises one of:
a third de-registering unit, configured to receive a de-register request message from the femto base station and send a de-register response message to the femto base station; or
a fourth de-registering unit, configured to send a de-register request message to the femto base station and receive a de-register response message from the femto base station; and
wherein the de-register request message comprises: a first identifier of a neighboring base station or/and a second identifier of an access gateway other than the access gateway, so that the femto base station directs a terminal it is currently serving to the neighboring base station corresponding to the first identifier or/and registers with the other access gateway corresponding to the second identifier.

8. The access gateway according to claim 7, wherein the second de-authenticating module comprises one of:
a second de-authenticating unit, configured to initiate a de-authentication procedure to the security gateway when the de-register request message carries a reason of de-registration which is termination of a radio access service or power shutoff and the de-register response message of the third de-registering unit carries an indication of accepting de-registration, so that the security gateway and the authentication server de-authenticate the femto base station; or
a third de-authenticating unit, configured to initiate a de-authentication procedure to the security gateway when the de-register response message carries a state of de-registration which is termination of a radio access service or power shutoff and carries an indication of accepting de-registration, so that the security gateway and the authentication server de-authenticate the femto base station.

9. An access gateway, comprising:
a second de-registering module, configured to perform a de-registration procedure with a femto base station; and
a second de-authenticating module, configured to de-authenticate the femto base station in the second de-registering module through a security gateway and an authentication server;
a second air interface disabling module, configured to send an indication message for disabling an air interface of the femto base station to a management entity before the femto base station is de-authenticated by the security gateway and the authentication sever, wherein the indication message is used for the management entity to withdraw a radio spectrum resource used by the femto base station after the management entity receives the indication message.

* * * * *